(12) United States Patent
Hasegawa (10) Patent No.: US 8,350,985 B2
(45) Date of Patent: Jan. 8, 2013

(54) ELECTRO-OPTIC APPARATUS AND ELECTRONIC INSTRUMENT

(75) Inventor: Kazuya Hasegawa, Azumino (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 12/405,471

(22) Filed: Mar. 17, 2009

(65) Prior Publication Data

US 2009/0244821 A1    Oct. 1, 2009

(30) Foreign Application Priority Data

Mar. 28, 2008    (JP) .................................. 2008-086051

(51) Int. Cl.
 *G02F 1/1333*    (2006.01)
(52) U.S. Cl. ............ 349/60; 349/58; 349/149; 349/150; 349/152; 349/153; 361/679.01; 439/189
(58) Field of Classification Search .................... 349/58, 349/60, 149, 150, 152, 153
See application file for complete search history.

(56) References Cited

U.S. PATENT DOCUMENTS

| | | | | |
|---|---|---|---|---|
| 5,929,950 A * | 7/1999 | Matsuda | ........................ | 349/60 |
| 6,724,445 B2 * | 4/2004 | Natsuyama | ...................... | 349/58 |
| 6,809,916 B2 * | 10/2004 | Nakata et al. | .................. | 361/115 |
| 6,919,940 B2 * | 7/2005 | Noh | ................. | 349/58 |
| 7,304,837 B2 * | 12/2007 | Lo et al. | .................... | 361/679.27 |
| 7,342,743 B2 * | 3/2008 | Kuwajima | ................. | 360/97.02 |
| 7,372,700 B2 * | 5/2008 | Jeong | ............................. | 361/704 |
| 7,630,023 B2 * | 12/2009 | Jee et al. | ......................... | 349/58 |
| 2006/0061945 A1 * | 3/2006 | Kim | ................. | 361/681 |
| 2006/0110949 A1 * | 5/2006 | Jee et al. | ......................... | 439/64 |
| 2006/0170839 A1 * | 8/2006 | Yamamoto et al. | ............. | 349/58 |
| 2006/0274224 A1 * | 12/2006 | Jeong | ............................. | 349/58 |
| 2007/0195494 A1 * | 8/2007 | Miyoshi et al. | ................ | 361/681 |
| 2007/0279546 A1 * | 12/2007 | Sohn | ................. | 349/58 |
| 2008/0020617 A1 * | 1/2008 | Lee et al. | ...................... | 439/189 |

FOREIGN PATENT DOCUMENTS

| | | |
|---|---|---|
| JP | 2003-157022 | 5/2003 |
| JP | 2003-279972 | 10/2003 |
| JP | 2005-099221 | 4/2005 |
| JP | 2005-321614 | 11/2005 |
| JP | 2006-038993 | 2/2006 |
| JP | 2006-065008 | 3/2006 |
| JP | 2006-337703 | 12/2006 |
| KR | 2008018646 | * 2/2008 |

OTHER PUBLICATIONS

Japanese Office Action issued on Aug. 3, 2010 corresponding to Japanese Patent Appln. No. 2008-086051.

* cited by examiner

*Primary Examiner* — Edward Glick
*Assistant Examiner* — Sang Nguyen
(74) *Attorney, Agent, or Firm* — K&L Gates LLP (57) ABSTRACT

An electro-optic apparatus includes: an electro-optic panel; and a holding member configured to hold at least the electro-optic panel, in which the holding member includes a shoulder configured to support at least part of a peripheral edge of the electro-optic panel, and the shoulder does not support the electro-optic panel in at least an area of a part of a corner and a proximity thereof.

11 Claims, 9 Drawing Sheets

ELECTRO-OPTIC APPARATUS AND ELECTRONIC INSTRUMENT

BACKGROUND

1. Technical Field

The present invention relates to an electro-optic apparatus and an electronic instrument.

2. Related Art

Currently, in various electronic instruments such as mobile phone sets or mobile data terminal equipment, a liquid crystal device (electro-optic apparatus) is used as a display unit for visually displaying various information. As an example of such liquid crystal devices, there is a known structure having a liquid crystal panel (electro-optic panel), a backlight, and a frame (holding member) for storing the liquid crystal panel and the backlight.

The liquid crystal panel includes a pair of substrates, a sealing member formed between the pair of substrates along an outer periphery of one of the substrates, and liquid crystal arranged in an area surrounded by the pair of substrates and the sealing member. A driver and the like are provided on a protruded portion provided on one of the pair of substrates which constitute the liquid crystal panel.

JP-A-2003-279972 is an example of related art.

In general, the liquid crystal panel is held by the substantially entire circumference thereof being bonded in the frame which constitutes the backlight. However, when a module falls down, a stress tends to concentrate to a corner of the liquid crystal panel and, in particular, a panel breakage occurs often at the protruded portion of the substrate formed of a single glass panel.

SUMMARY

An advantage of some aspects of the invention is to provide an electro-optic apparatus and an electronic instrument which achieve prevention of breakage of an electro-optic panel due to an impact at the time of drop effectively.

According to a first aspect of the invention, an electro-optic apparatus includes an electro-optic panel and a holding member configured to hold at least the electro-optic panel, in which the holding member includes a shoulder configured to support at least part of a peripheral edge of the electro-optic panel, and the shoulder does not support the electro-optic panel in at least an area of a part of a corner and a proximity thereof.

In this configuration, since the shoulder of the holding member configured to hold the electro-optic panel does not support in the at least a part of an area of the corner and the proximity thereof, an impact at the time of drop is prevented from being transferred directly to the corners or the proximities thereof of the electro-optic panel from the holding member, so that the breakage of the electro-optic panel is prevented.

Therefore, a liquid crystal device which is superior in impact resistance is achieved.

Preferably, the holding member includes a side wall portion opposing a side surface of the electro-optic panel and the shoulder formed inside the side wall portion.

In this configuration, the electro-optic panel is satisfactorily held by the holding member while preventing the breakage of the panel at the time of drop.

Preferably, the electro-optic panel includes a pair of substrates, one of the pair of substrates has a protruded portion which is not overlapped with the other substrate, the electro-optic panel is supported by the shoulder from the side of the one substrate, and the shoulder does not support the protruded portion.

In this configuration, since the shoulder does not support the protruded portion of the electro-optic panel, the impact at the time of drop is prevented from being transferred directly to the protruded portion via the holding member. Although the protruded portion which is a single substrate has a weakness for the impact in comparison with other areas where the substrates are overlapped with each other, since it is held in a state of being away from the shoulder, application of a stress from the holding member to the protruded portion is avoided.

Preferably, the shoulder does not support the electro-optic panel at the corner and the proximity thereof located out of an area overlapped with the protruded portion.

In this configuration, since the four corners (four corners and the proximities thereof) of the electro-optic panel are not supported by the holding member, a concentration of the stress from the holding member to these points is prevented, so that the breakage of the electro-optic panel is prevented.

Preferably, the shoulder is formed to be lower than an area which comes into contact with the electro-optic panel in the at least a part of an area of the corner and the proximity thereof.

In this configuration, since the at least a part of an area of the corner and the proximity thereof of the shoulder do not come into contact with (do not support) the electro-optic panel, the impact at the time of drop is prevented from being transferred to the electro-optic panel via the holding member. Also, the strength of the holding member is improved more than a case in which the shoulder is not formed in the at least a part of an area of the corner and the proximity thereof of the holding member.

Preferably, the shoulder includes a bevel which declines from the area which comes into contact with the electro-optic panel toward an apex of the corner in the at least a part of an area of the corner and the proximity thereof.

In this configuration, by the provision of the bevel which declines from the area which comes into contact with the electro-optic panel toward the corner, the apex of the corner is located at a level lower than the area which comes into contact with the electro-optic panel, so that a state in which the corner of the shoulder is located at a position farthest from the corner of the electro-optic panel is achieved. Therefore, the impact at the time of drop is prevented from being transferred the corner of the electro-optic panel via the shoulder (holding member).

Preferably, an upper end of the bevel is positioned on the side away from the corner of the holding member than an end of a sealing member on the side of the corner of the electro-optic panel extending in parallel with the shoulder in the direction of extension of the shoulder having the bevel formed thereon.

In this configuration, the impact at the time of drop is prevented from being transferred to an area outside the sealing member of the electro-optic panel via the holding member. Since the area outside the sealing member of the electro-optic panel is peripheral edges of the respective substrates, nothing is interposed therebetween, and hence is fragile more than an area inside the sealing member. Therefore, in the embodiment of the invention, the upper end of the bevel is positioned on the side away from the corner of the holding member than the end of the sealing member on the side of the corner of the electro-optic panel extending in parallel with the shoulder in the direction of extension of the shoulder having the bevel formed thereon. Accordingly, the impact at the time of drop is reliably prevented from being transferred to the area outside the seal member of the electro-optic panel (that is, the peripheral edges of the substrates) via the holding member, so that the breakage of the electro-optic panel is prevented.

Preferably, the shoulder is provided with a shock absorbing member in the at least a part of an area of the corner and the proximity thereof.

In this configuration, since the shock absorbing member is provided on the shoulder in the at least a part of an area of the corner and the proximity thereof, the holding member is prevented from being bent and hence coming into contact with the electro-optic panel at the time of drop. With the intermediary of the shock absorbing member between the holding member and the electro-optic panel, the bending of the holding member by itself is also restrained.

Preferably, the shoulder is not formed in an area of the holding member which does not support the electro-optic panel.

In this configuration, the impact at the time of drop is completely prevented from being transferred to the electro-optic panel via the holding member. A weight reduction of the entire holding member is achieved, and a heat radiation property is improved.

Preferably, the area of the shoulder which supports the electro-optic panel is formed of a double-faced adhesive member.

In this configuration, since the area of the shoulder which supports the electro-optic panel is formed of the double-faced adhesive member, the electro-optic panel is fixedly adhered to the holding member and, simultaneously, the impact at the time of drop is alleviated by the double-faced adhesive member. Since the impact at the time of drop is not transferred directly to the electro-optic panel via the holding member by the double-faced adhesive member, the breakage of the electro-optic panel is prevented.

According to a second aspect of the invention, an electronic instrument includes the liquid crystal device superior in impact resistance, the electronic instrument having a high-reliability is achieved.

BRIEF DESCRIPTION OF THE DRAWINGS

The invention will be described with reference to the accompanying drawings where like numbers reference like elements.

DESCRIPTION OF EXEMPLARY EMBODIMENTS

Referring now to the drawings, embodiments of the invention will be described. In the following drawings, film thicknesses or dimensional ratios of respective components are modified as needed for the simplicity of understanding of the drawings.

Liquid Crystal Device

Figure 1:
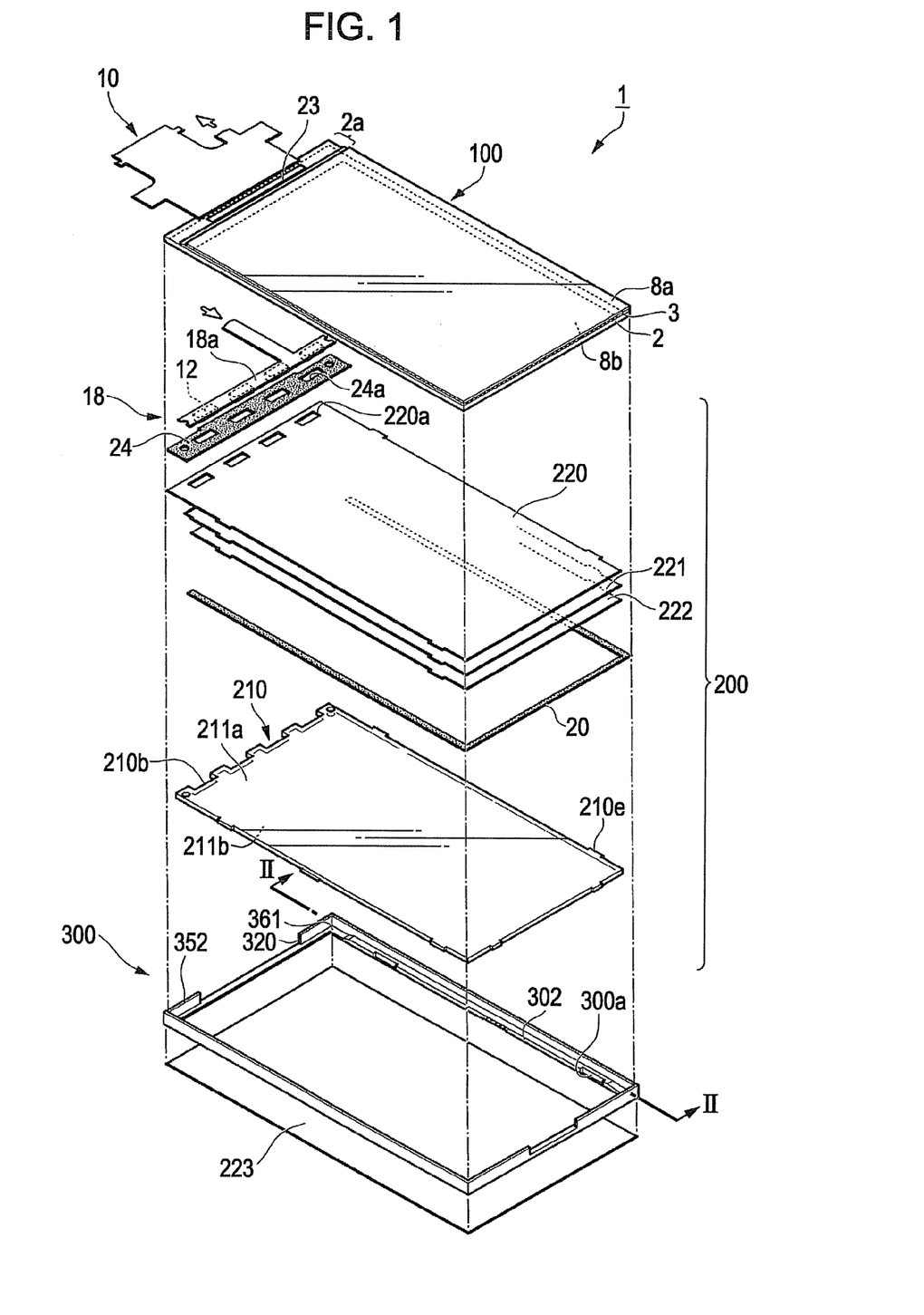
FIG. 1 is an exploded perspective view of a liquid crystal device according to an embodiment of the invention.
Figure 2:
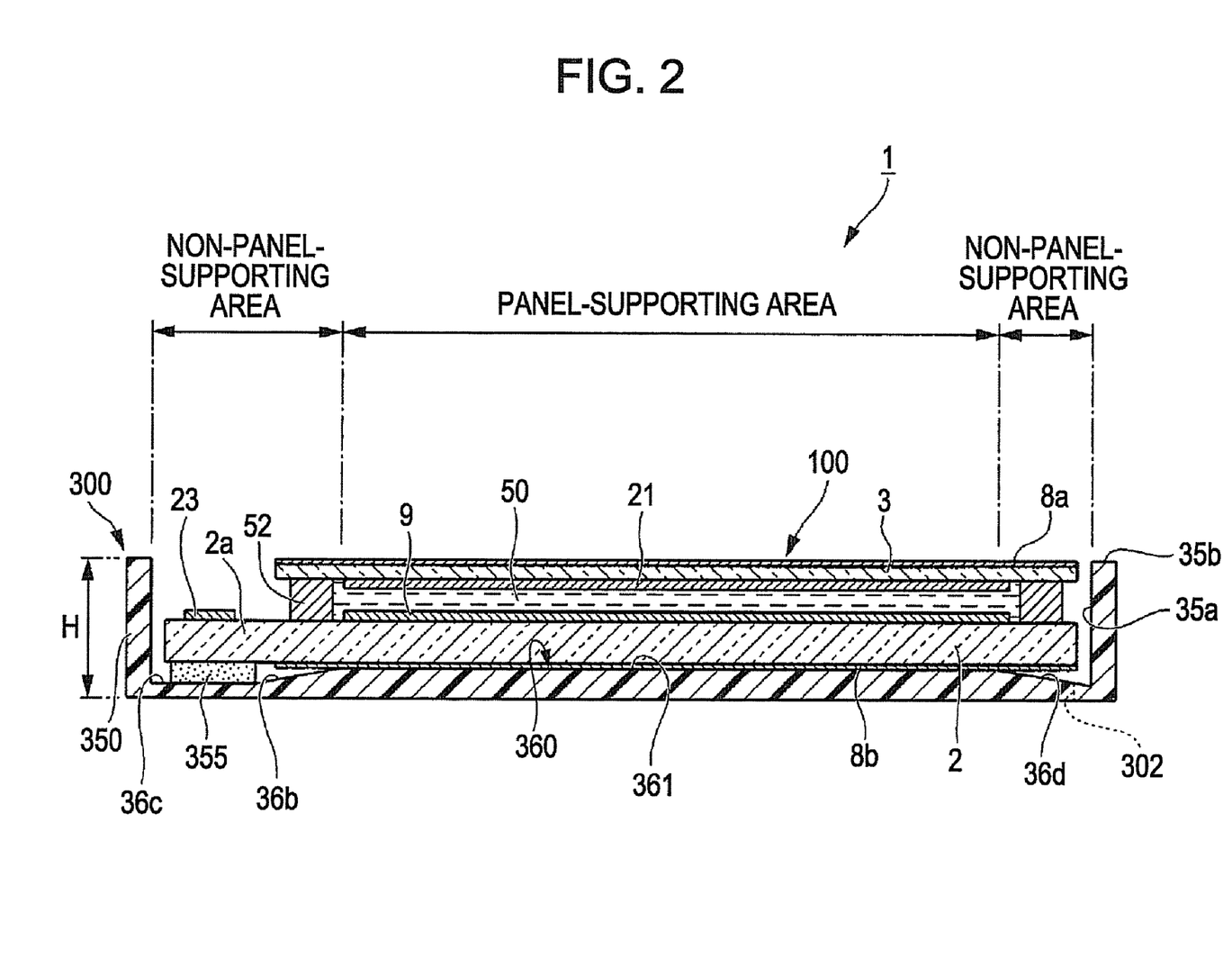
FIG. 2 is a cross-sectional view of the liquid crystal device taken along the line II-II in FIG. 1.
Figure 3:
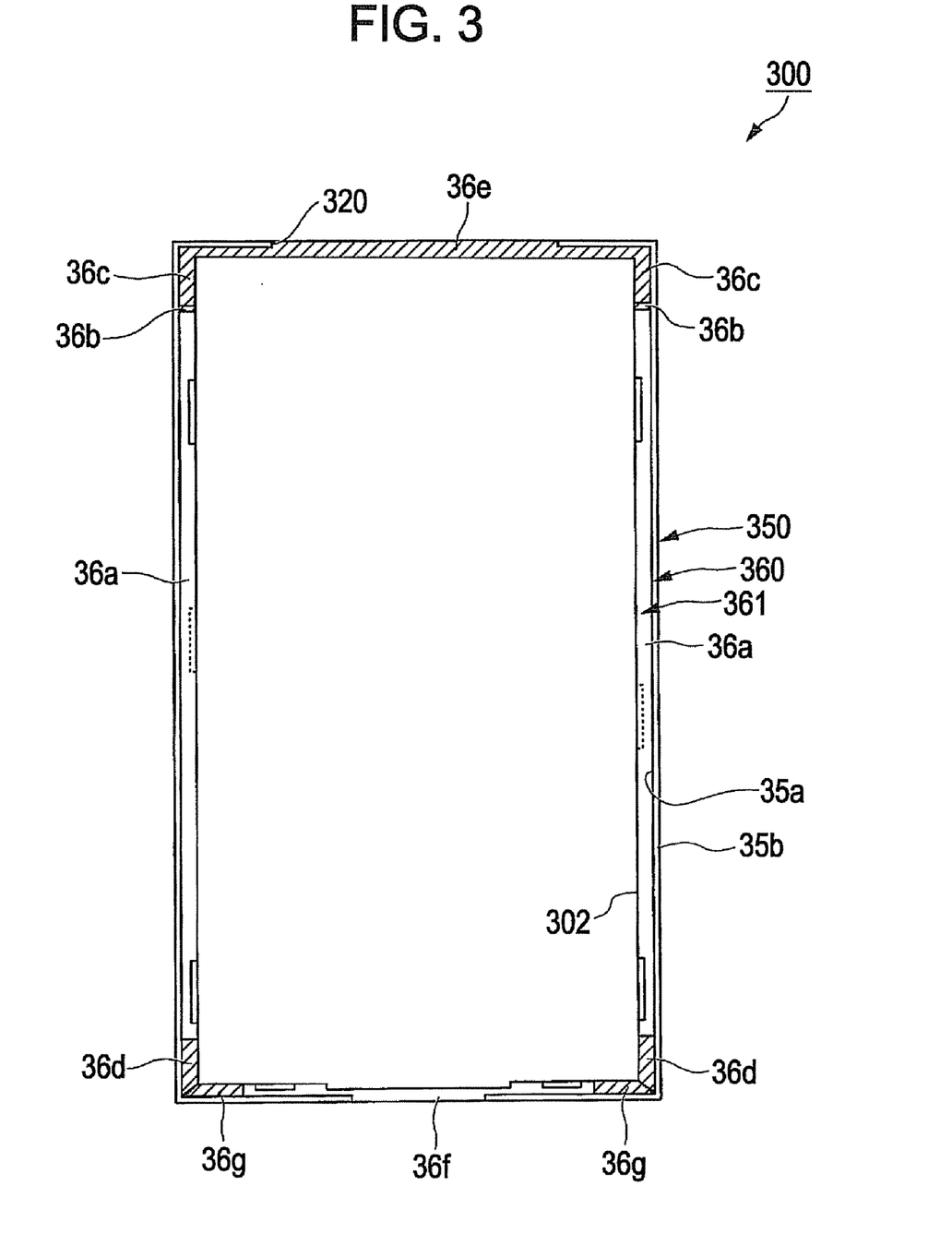
FIG. 3 is a plan view showing a schematic configuration of a frame.
Figure 4A:
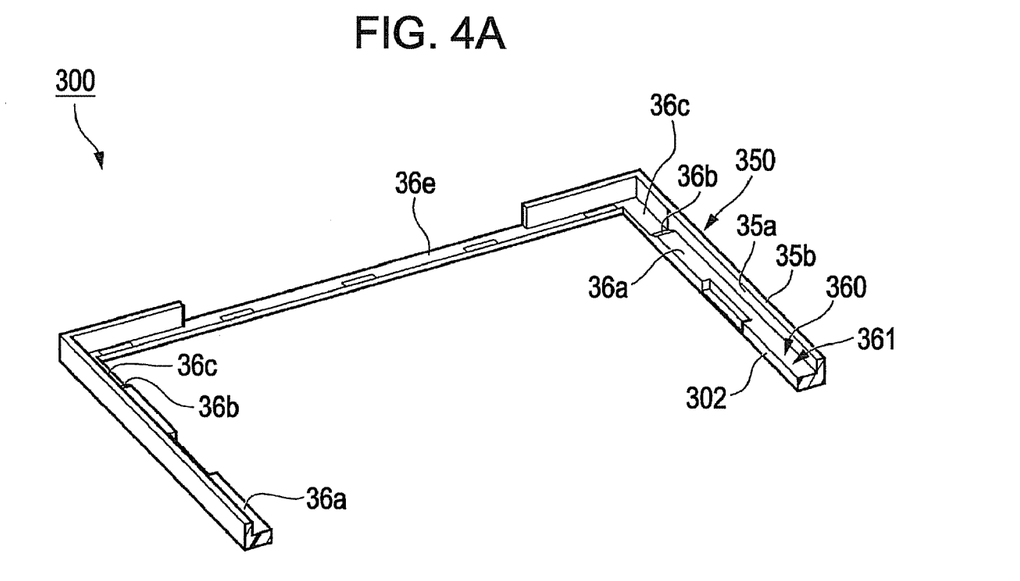
FIGS. 4A and 4B are perspective views showing a principal portion of the frame.
Figure 4B:
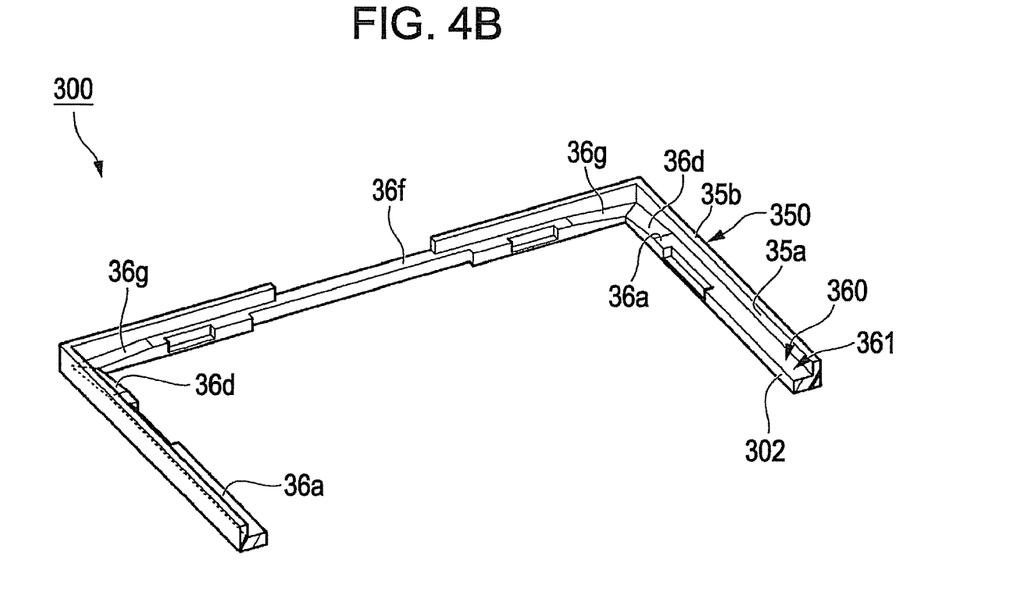
Figure 6:
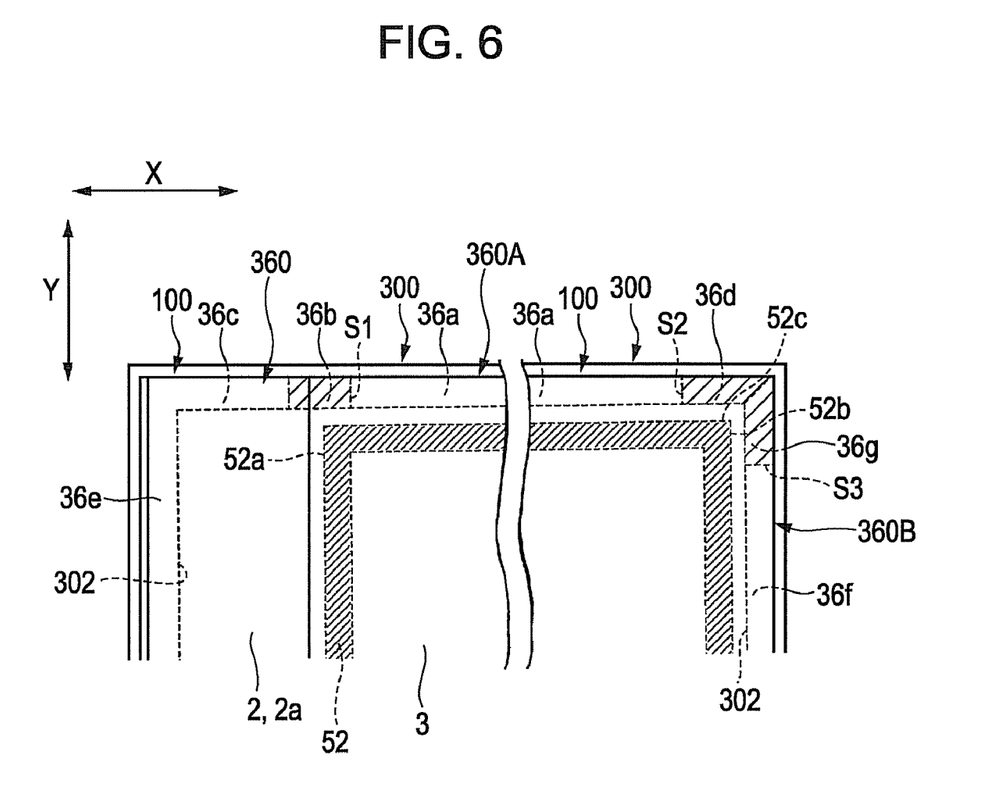
FIG. 6 is a plan view showing a positional relationship between the bevels of the frame and a sealing member of a liquid crystal panel.

A liquid crystal device will be described below as an example of an embodiment of an electro-optic apparatus according to the invention. FIG. 1 is an exploded perspective view of a liquid crystal device according to the embodiment. FIG. 2 is a cross-sectional view showing a principal portion of the liquid crystal device in the embodiment, and is a cross-sectional view of the liquid crystal device taken along the line II-II in FIG. 1. FIG. 3 is a plan view showing a schematic configuration of a frame. FIGS. 4A and 4B are perspective views showing a principal portion of the frame in an enlarged scale. FIG. 6 is a plan view showing a positional relationship between the liquid crystal panel and the bevels of the frame.

As shown in FIG. 1, a liquid crystal device 1 (electro-optic apparatus) includes a liquid crystal panel 100 (electro-optic panel), a driving FPC (Flexible Printed Circuit) substrate 10 connected to the liquid crystal panel 100, a backlight 200 (lighting device) arranged on the back surface side of the liquid crystal panel 100, and a frame 300 (holding member) configured to accommodate the liquid crystal panel 100 and the backlight 200. The liquid crystal device 1 in the embodiment includes a light source FPC substrate 18 having a plurality of LEDs 12 which serve as light sources of the backlight 200 in addition to the driving FPC substrate 10 configured to drive the liquid crystal panel 100.

The liquid crystal panel 100 includes a first substrate 3, a second substrate 2 having a protruded portion 2a which is protruded from the first substrate 3, a sealing member 52 provided on a peripheral edge of the substrate so as to bond the first substrate 3 and the second substrate 2 to each other, a liquid crystal layer 50 as an electro-optic material arranged in a space defined by the first substrate 3, the second substrate 2, and the sealing member 52, and a first sheet polarizer 8a and a second sheet polarizer 8b provided so as to sandwich the pair of substrates 2 and 3 as shown in FIG. 2. The first substrate 3 and the second substrate 2 are formed of translucent glass, plastic, or the like.

Formed on a surface of the second substrate 2 opposing the first substrate 3 are a plurality of pixel electrodes 9 formed of ITO (Indium Tin Oxide) and an alignment layer formed of polyimide or the like so as to cover the pixel electrodes 9. In contrast, formed on a surface of the first substrate 3 opposing the second substrate 2 are an opposed electrode 21 formed of ITO film, and an alignment layer formed of polyimide or the like so as to cover the opposed electrode 21. Here, the pixel electrodes 9, the opposed electrode 21, and the alignment layers for covering the same are formed according to the known technology, and are not shown in FIG. 2.

A drive IC 23 and input terminals (not shown) required for driving the liquid crystal panel 100, for example, are connected to an upper surface of the protruded portion 2a. Drive signals or electric power are supplied to the liquid crystal panel 100 via the FPC substrate 10 by connecting an external power source or various external apparatuses to the input terminals. The driving FPC substrate 10 is formed, for example, of FPC which includes a film formed of polyimide, polyester, or the like as a base material, and is superior in flexibility.

As shown in FIG. 1, the backlight 200 includes a substantially rectangular light guide panel 210 facing its light emitting surface 211a toward the second substrate 2 of the liquid crystal panel 100, the light source FPC substrate 18 having the LEDs 12 as the light sources stored in an LED fitting portion 210b of the light guide panel 210 when being assembled as the liquid crystal device 1, a diffusing panel 222 and two prism sheets 220 and 221 as rectangular sheet-type optical components arranged between the liquid crystal panel 100 and the light guide panel 210 in sequence from the light guide panel 210 toward the liquid crystal panel 100, and a reflecting panel 223 as a rectangular sheet-type optical component arranged by being laminated on a back surface 211b of the light guide panel 210 opposite from the light emitting surface 211a.

The prism sheet 220 is adhered to the light source FPC substrate 18 via an adhesive sheet 24. The adhesive sheet 24 and the prism sheet 220 are formed with a plurality of holes 24a and 220a corresponding to the respective LEDs 12 of the light source FPC substrate 18, and when they are adhered to each other, the LEDs 12 are inserted into the holes 24a and 220a and are exposed to the back surface side (the side of the light guide panel 210).

The frame 300 is formed substantially into a frame shape and, more specifically, is a frame shape having removed a rectangular center portion therefrom in the embodiment and, for example, is formed of polycarbonate, fluorine resin, or a resin such as ABS resin. The frame 300 is formed with recesses 300a corresponding to a plurality of projections 210e of the light guide panel 210. The projections 210e are fitted into the recesses 300a, so that the light guide panel 210 is fixed to the frame 300.

The light guide panel 210 is fitted from the back side of the frame 300.

The liquid crystal device according to the embodiment has characteristics in the frame 300. Referring now to FIG. 2 to FIG. 6, a configuration of the frame 300 will be described in detail.

As shown in FIG. 2 and FIG. 3, the frame 300 is the frame-shaped holding member configured to hold the light guide panel 210 and the liquid crystal panel 100, and is formed with an opening 302 at the center thereof from the viewpoint of a heat radiating property, a weight reduction, and a thickness reduction. The opening 302 is formed into dimensions which match the outline of the light guide panel 210, and the light guide panel 210 (FIG. 1) is fitted and stored therein.

The frame 300 includes a shoulder 360 configured to support at least part of a peripheral edge of the liquid crystal panel 100, and is configured not to support four corners of the liquid crystal panel 100 and proximities thereof. The shoulder 360 is configured not to support the peripheral edge of the protruded portion 2a including the adjacent two corners in addition to the configuration not to support the corners and the proximities thereof of the liquid crystal panel 100, and is configured to hold the liquid crystal panel 100 in the frame 300 by supporting portions other than the portions described above.

The frame 300 includes a side wall portion 350 which constitutes an outer frame and the shoulder 360 formed inside the side wall portion 350, and the side wall portion 350 and the shoulder 360 are integrally molded by injection molding. Since a height H (FIG. 2) of the side wall portion 350 is set to a value which allows the thickness of the liquid crystal panel 100, the accommodated liquid crystal panel 100 does not protrude from the frame 300.

The shoulder 360 provided so as to protrude inwardly of the side wall portion 350 extends substantially vertically with respect to an inner peripheral surface 35a of the side wall portion 350, and includes a principal surface 361 having a different height from an upper surface 35b of the side wall portion 350. The principal surface 361 includes panel-supporting areas including first surfaces 36a, 36a, and 36f and non-panel-supporting areas including second surfaces 36c, 36c, and 36e, first bevels 36b and 36b and second bevels 36d, 36d, 36g, and 36g (areas shown in FIG. 3 with patterns), and the non-panel-supporting areas are areas at a level lower than the panel-supporting areas (the areas coming into contact with the liquid crystal panel 100).

Figure 5A:
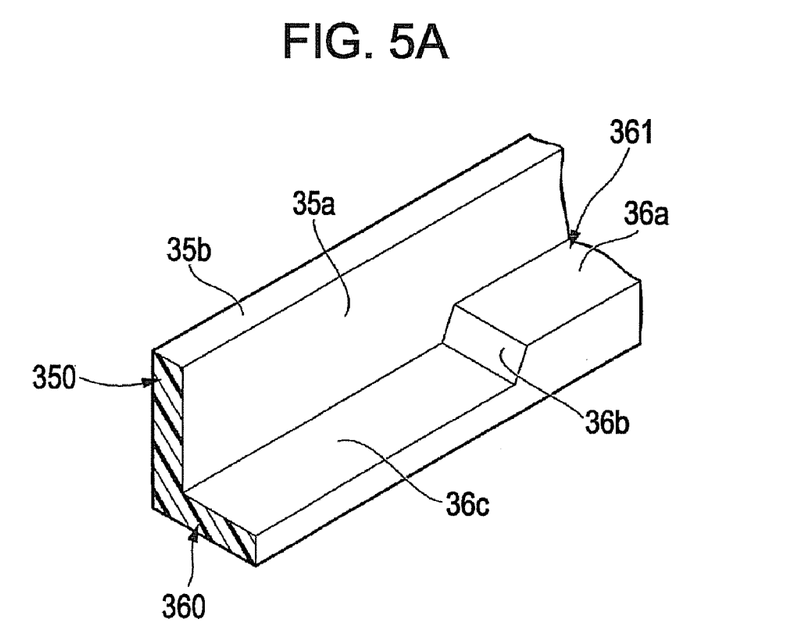
FIGS. 5A and 5B are perspective view showing a configuration of a corner of the frame and a portion in the proximity (bevel) thereof.

As shown in FIG. 3 and FIG. 4A, the first surfaces 36a and 36a extending along the longitudinal direction of the frame 300 are respectively connected at one end to the second surfaces 36c and 36c which are lower than the first surfaces 36a and 36a via the first bevels 36b and 36b, respectively, and the second surfaces 36c and 36c are respectively connected at one end to both ends of the second surface 36e extending along the short side of the frame 300 in abutment with each other. The first bevels 36b and 36b are bevels declining from the first surfaces 36a and 36a toward apexes of the corners of the frame 300, that is, toward the second surfaces 36c and 36c as shown in FIG. 5A as well, and the first surfaces 36a and 36a and the second surface 36e having the heights different from each other are connected to each other via the first bevels 36b and 36b and the second surfaces 36c and 36c. In this manner, by forming the second surfaces 36c, 36c, and 36e which are overlapped two-dimensionally with the protruded portion 2a of the liquid crystal panel 100 to be low, a configuration not to support the protruded portion 2a is achieved.

Figure 5B:
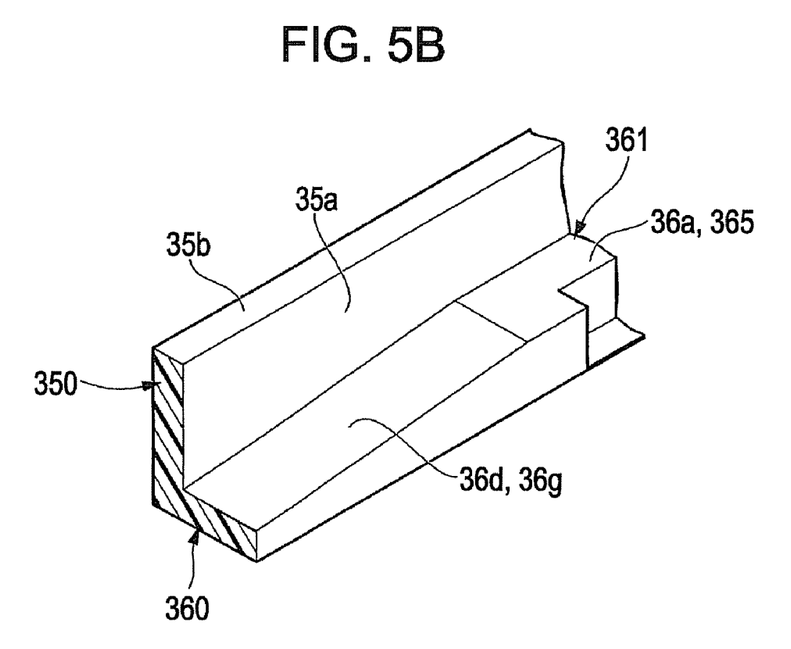

In contrast, the other ends of the first surfaces 36a and 36a are connected respectively to the second bevels 36d and 36d as shown in FIG. 3 and FIG. 4B. The second bevels 36g and 36g are connected respectively to both ends of the first surface 36f which extends along the short side of the frame 300 so as to oppose the second surface 36e. Then, the second bevels 36d and 36d and the second bevels 36g and 36g are connected so as to be in abutment with each other at ends thereof at the corners of the frame 300. The second bevels 36d and 36d are bevels declining from the first surfaces 36a and 36a toward the apexes of the corners as shown in FIG. 5B, so that the apexes of the corners of the frame 300 are positioned at the lowest (deepest) level. Then, the second bevels 36d, 36d, 36g, and 36g are adapted not to support the corners and the proximities thereof positioned in the areas other than the areas which overlap two-dimensionally with the protruded portion 2a of the liquid crystal panel 100.

The apexes of the four corners and the second surfaces 36c and 36c and the second surface 36e at the proximities of the corners of the frame 300 all have the same height (depth), so as to be positioned at farthest positions from the corners and the proximities thereof of the liquid crystal panel 100 in the direction of the panel thickness. It is also applicable to form the corners of the frame 300 which correspond respectively to the corners of the protruded portion 2a as a single substrate to be lower than other corners.

Referring now to FIG. 6, the positional relationship between the bevels of the frame and the liquid crystal panel will be described. In FIG. 6, scales of the respective configurations are differentiated for the sake of easiness of explanation.

As shown in FIG. 6, an upper end S1 of the bevel of the first bevel 36b is positioned on the side away from the corner of the frame 300 than an end 52a of the sealing member 52 on the side of the corner of the liquid crystal panel 100 extending in parallel with a shoulder 360A in the direction of extension of the shoulder 360A (direction of X-axis: longitudinal direction of the frame 300) formed with the first bevels 36b and 36b.

An upper end S3 of the bevel of the second bevel 36g is positioned on the side away from the corner of the frame 300 than an end 52c of the sealing member 52 on the side of the corner of the liquid crystal panel 100 extending in parallel with the shoulder 360B in the direction of extension of the shoulder 360B (direction of Y-axis: short side of the frame 300) formed with the second bevel 36g.

An upper end S2 of the bevel of the second bevel 36d is positioned on the side away from the corner of the frame 300 than an end 52b of the corner of the sealing member 52 on the side of the liquid crystal panel 100 extending in parallel with the shoulder 360A in the direction of extension of the shoulder 360A formed with the second bevel 36d.

As shown also in FIGS. 5A and 5B, the second bevels 36d and 36g are formed into gentle bevels in comparison with the first bevel 36b and reach respectively to the corresponding apexes of the corners. The angles of inclination of the first bevel 36b and the second bevels 36d and 36g are to be set as appropriate. However, since a configuration not to support the entire circumference of the protruded portion 2a of the liquid crystal panel 100 is essential, it is preferable to form specifically the first bevel 36b into a bevel of an angle which is able to secure an area which is low to some extent from the lower end of the first bevel 36b to the apex of the corner. It is preferable to form connecting portions between the first surface 36a and the first bevel 36b into a rounded shape to alleviate a stress to the liquid crystal panel 100.

In this manner, by the existence of a plurality of the first bevels 36b and 36b and the second bevels 36d, 36d, 36g, and 36g, the principal surface 361 having a level difference in the circumference direction is achieved.

In the embodiment, elastic shock absorbing members 355 are arranged respectively on the second surfaces 36c and 36c connected to the first bevels 36b and 36b as shown in FIG. 2. By the interposition of the shock absorbing members 355 in the areas corresponding to the proximities of the corners of the liquid crystal panel 100, a gap between the liquid crystal panel 100 and the frame 300 is filled partly thereby, so that satisfactory accommodation of the liquid crystal panel 100 is achieved. Since the thickness of the shoulder 360 where the second surfaces 36c, 36c, and 36e are formed is thinner than other areas, it is liable to bend. However, by the interposition of the shock absorbing members 355 with respect to the liquid crystal panel 100, bending of the frame 300 at the time of drop is restrained.

In this configuration, since the shoulder 360 of the frame 300 which holds the liquid crystal panel 100 does not support the four corners and the proximities thereof (protruded portion 2a) of the liquid crystal panel 100 directly, the impact at the time when the liquid crystal device 1 drops is prevented from being transferred directly to the respective corners and the proximities thereof (protruded portion 2a) of the liquid crystal panel 100 from the frame 300. The protruded portion 2a of the liquid crystal panel 100 formed of the single substrate is vulnerable to an impact in comparison with other portions where the substrates 2 and 3 are overlapped. In the embodiment, since the protruded portion 2a of the liquid crystal panel 100 is away from (not in contact with) the frame 300 in the state in which the panel is stored, the impact at the time of drop is prevented from being transferred directly to the protruded portion 2a via the frame 300.

In this manner, by preventing the stress from the frame 300 from concentrating to the four corners or the proximities thereof (protruded portion 2a) of the liquid crystal panel 100 at the time of drop, a breakage of the liquid crystal panel 100 is prevented.

The upper ends S1, S2, and S3 of the bevels of the first bevels 36b and 36b and the second bevels 36d, 36d, 36g, and 36g are positioned on the side away from the corners of the frame 300 than the ends 52a, 52b, and 52c of the sealing member 52 on the side of the corners of the liquid crystal panel 100 in the respective directions of extension thereof.

Therefore, the areas other than the corners and the proximities thereof (protruded portion 2a) of the liquid crystal panel 100 are reliably supported, and simultaneously, the impact at the time of drop is prevented from being transferred to the corners of the liquid crystal panel 100 outside the sealing member 52 and the proximity thereof (protruded portion 2a) via the frame 300. Since the area of the liquid crystal panel 100 outside the sealing member 52 is the area corresponding to the peripheral edges of the substrates 2 and 3, nothing is interposed therebetween, and hence it is fragile more than other areas (area inside the sealing member 52). However, according to the configuration of the embodiment described above, the impact at the time of drop is reliably prevented from being transferred to the area of the liquid crystal panel 100 outside the sealing member 52 via the frame 300. Accordingly, the reliability of the liquid crystal panel 100 as a product is secured by preventing the breakage thereof.

Also, since the non-panel-supporting area of the frame 300 is formed to be thin, a weight reduction of the frame 300 is achieved.

Although the side wall portion 350 is formed with a recess 320 for holding the driving FPC substrate 10 described above, the side wall portion 350 may be formed with several recesses in addition to the recesses 320 and 330 for heat radiation and the weight reduction of the frame 300.

Although the preferable embodiment of the invention has been described thus far referring to the attached drawings, the invention is not limited to the embodiment described above as a matter of course, and the embodiments may be combined. It is apparent for those skilled in the art that the invention may be improved or modified within the scope of the invention described in appended claims, and these improvements or modifications are apparently included in the technical scope of the invention.

Figure 7:
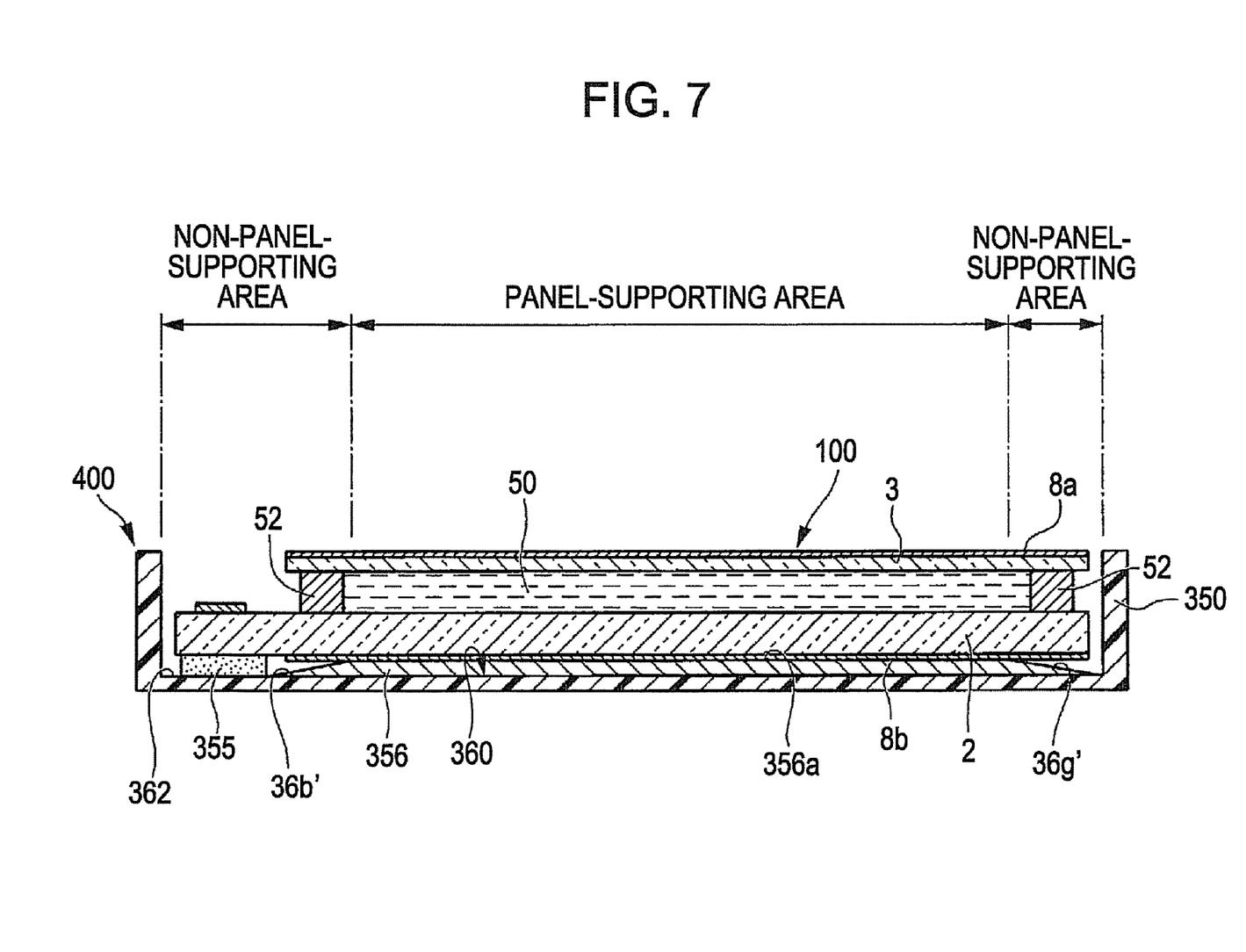
FIG. 7 shows another embodiment of the frame.

As shown in FIG. 7, a non-panel-supporting area of a frame 400 may be formed of a double-faced adhesive member 356 having a predetermined thickness. In other words, the principal surface 362 of the frame 400 is formed into an even plane having no level difference in the circumferential direction thereof, and the shoulder 360 for holding the liquid crystal panel 100 in the inner surface of the frame 400 is formed by the double-faced adhesive member 356 arranged on the part of the principal surface 362. An upper surface 356a of the double-faced adhesive member 356 comes into contact with the liquid crystal panel 100. It may be configured in such a manner that bevels 36b' and 36g' of the double-faced adhesive member 356 are located at a boundary of the non-panel-supporting area with respect to the panel-supporting area. Since the double-faced adhesive member 356 has a resiliency, it allows alleviation of the impact at the time of drop simultaneously with adhesion between the frame 400 and the liquid crystal panel 100.

Figure 8:
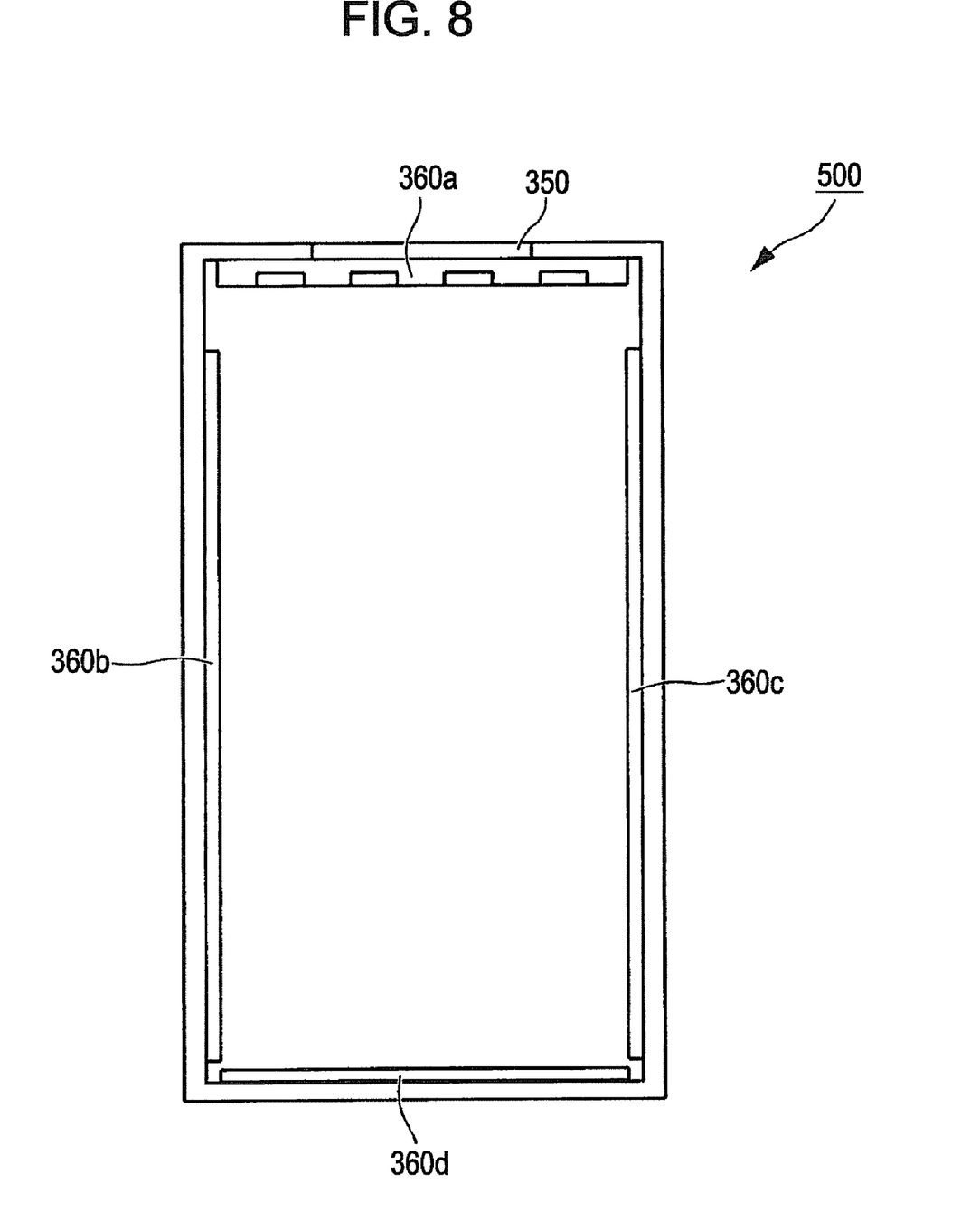
FIG. 8 shows still another embodiment of the frame.

As shown in FIG. 8, a non-panel-supporting area of a frame 500 may not be formed with the shoulder (bevel). For example, a configuration in which a plurality of shoulders 360a, 360b, 360c, and 360d are formed partly inside the side wall portion 350 in the circumferential direction of the frame 300 and at least the corners and the proximities thereof are opened, so that the corners and the proximities thereof of the liquid crystal panel 100 are not supported at all is also applicable. In this configuration as well, the same advantages as the embodiments described above are achieved, and cracking of the liquid crystal panel 100 is prevented.

It is also possible to extend the second sheet polarizer 8b of the liquid crystal panel 100 toward the protruded portion 2a thereby forming the shoulder 360 with the second sheet polarizer 8b.

Electronic Instrument

Subsequently, a detailed example of an electronic instrument having the electro-optic apparatus shown above will be described.

Figure 9A:
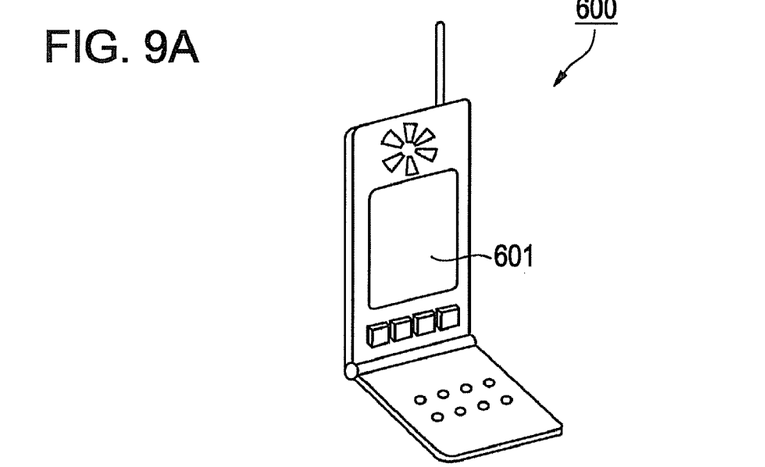
FIGS. 9A to 9C show electronic instruments according to the embodiments of the invention.
Figure 9B:
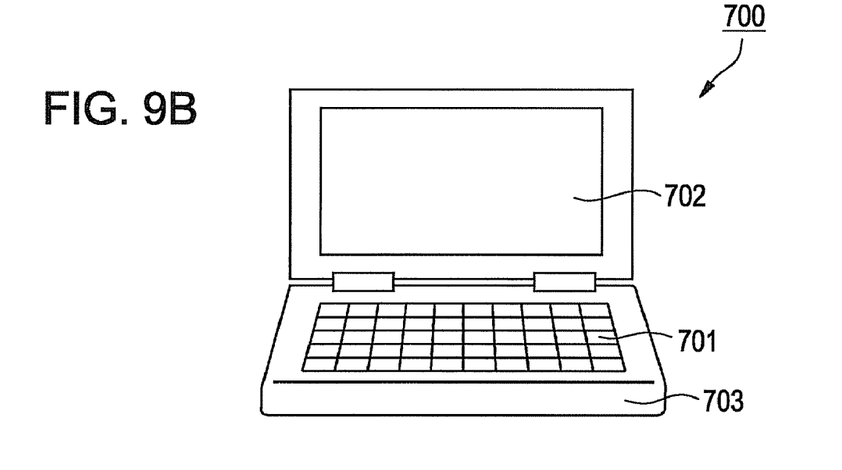
Figure 9C:
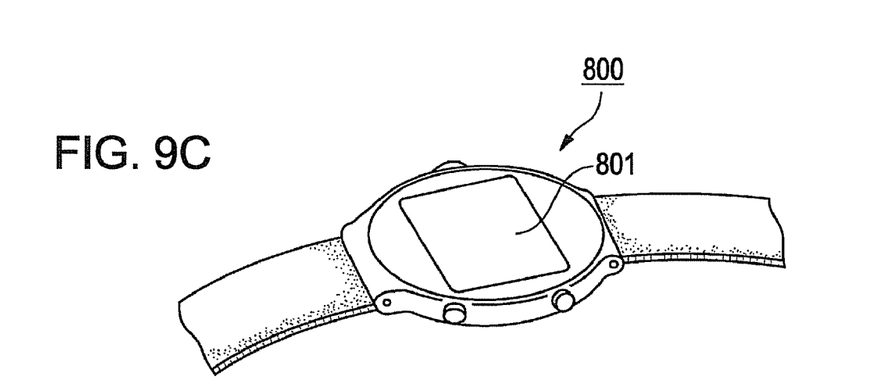

FIG. 9A is a perspective view of an example of a mobile phone set. In FIG. 9A, reference numeral 600 designates a mobile phone set body, and reference numeral 601 designates a liquid crystal display unit having the liquid crystal display device described in the embodiments shown above. FIG. 9B is a perspective view of an example of a mobile data processing apparatus such as word processors or personal computers. In FIG. 9B, reference numeral 700 designates a data processing apparatus, reference numeral 701 designates an input unit such as a keyboard, reference numeral 703 designates a data processing apparatus body, and reference numeral 702 designates a liquid crystal display unit provided with the liquid crystal display device according to the embodiments described above. FIG. 9C is a perspective view of an example of a wrist watch type electronic equipment. In FIG. 9C, reference numeral 800 designates a wrist watch body, reference numeral 801 designates a liquid crystal display unit provided with the liquid crystal display device according to the embodiments shown above. Although the electronic instrument of the embodiment includes the liquid crystal display device, it may be provided with other electro-optical apparatus such as an organic EL display device or a PDP. The electronic instrument is not limited thereto, and may be applied to various electronic instruments having a display function.

For example, in addition to the examples shown above, facsimile machines having a display function, finders of digital cameras, mobile TV sets, electronic notepads, electronic bulletin boards, promo displays are also included.

According to the electronic instruments in the embodiment, since the liquid crystal device 1 which is superior in impact resistance is provided as a display unit as described above, a highly reliable instrument is achieved.

The electronic instrument in the invention includes also electronic notebooks, personal computers, electronic books, view finder type or monitor direct-view video tape recorders, car navigation apparatuses, pagers, electronic databooks, calculators, word processors, work stations, TV phones, and POS terminals in addition to the mobile phone sets.

The entire disclosure of Japanese Patent Application No. 2008-086051, filed Mar. 28, 2008 is expressly incorporated by reference herein.

What is claimed is:

1. An electro-optic apparatus comprising:
   an electro-optic panel; and
   a holding member configured to hold at least the electro-optic panel, the holding member including a shoulder and a side wall portion, the shoulder formed at least to protrude inwardly from the side wall portion,
   wherein a supporting part of the shoulder is configured to support at least part of a peripheral edge of the electro-optic panel, and
   wherein a non-supporting part of the shoulder under the electro-optic panel in at least an area of a part of a corner and a proximity thereof does not support the electro-optic panel, said non-supporting part of the shoulder is formed with the entire inward protrusion of the shoulder to be lower than the supporting part of the shoulder such that a gap is foinied between the non-supporting part of the shoulder and the supporting part of the shoulder for the entire inward protrusion of the shoulder in a thickness direction of the holding member.

2. The electro-optic apparatus according to claim 1,
   wherein the side wall portion is opposing a side surface of the electro-optic panel.

3. The electro-optic apparatus according to claim 1,
   wherein the electro-optic panel includes a pair of substrates, one of the pair of substrates has a protruded portion which is not overlapped with the other substrate,
   the electro-optic panel is supported by the shoulder from the side of the one substrate, and
   the shoulder does not support the protruded portion.

4. The electro-optic apparatus according to claim 3,
   wherein the shoulder does not support the electro-optic panel at the corner and the proximity thereof located out of an area overlapped with the protruded portion.

5. The electro-optic apparatus according to claim 1,
   wherein the shoulder includes a bevel which declines from the area which comes into contact with the electro-optic panel toward an apex of the corner in the at least a part of an area of the corner and the proximity thereof.

6. The electro-optic apparatus according to claim 5,
   wherein an upper end of the bevel is positioned on the side away from the corner of the holding member than an end of a sealing member on the side of the corner of the electro-optic panel extending in parallel with the shoulder in the direction of extension of the shoulder having the bevel formed thereon.

7. The electro-optic apparatus according to claim 1,
   wherein the non-supporting part of the shoulder is provided with a shock absorbing member in the at least a part of an area of the corner and the proximity thereof.

8. The electro-optic apparatus according to claim 1,
   wherein the shoulder is not formed in an area of the holding member which does not support the electro-optic panel.

9. The electro-optic apparatus according to claim 1,
   wherein the area of the shoulder which supports the electro-optic panel is formed of a double-faced adhesive member.

10. An electronic instrument comprising the electro-optic apparatus according to claim 9.

11. The electro-optic apparatus according to claim 2,
    wherein the shoulder and the side wall portion are integrally molded.

* * * * *